United States Patent
Allen et al.

(10) Patent No.: US 6,336,580 B1
(45) Date of Patent: Jan. 8, 2002

(54) VEHICLE LOAD CARRIER AND FASTENING MECHANISM

(75) Inventors: Scott R. Allen; Joseph J. Settelmayer, both of Fieldbrook, CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/585,722

(22) Filed: May 31, 2000

(51) Int. Cl.[7] .............................. B60R 9/00; B60R 11/00
(52) U.S. Cl. ...................... 224/532; 224/519; 224/521; 224/534; 224/537; 224/924; 403/21; 403/378; 280/506
(58) Field of Search .................. 224/519, 520, 224/521, 523, 532, 534, 536, 537, 568, 570, 571, 924; 403/21, 22, 378, 379.3; 280/506

(56) References Cited

U.S. PATENT DOCUMENTS

| | | | |
|---|---|---|---|
| 4,389,135 A | * 6/1983 | Peters ........................ 403/327 |
| 4,676,414 A | * 6/1987 | Deguevara .............. 224/924 X |
| 5,067,641 A | * 11/1991 | Johnson et al. ......... 224/924 X |
| 5,190,195 A | * 3/1993 | Fullhart et al. ......... 224/519 X |
| 5,449,101 A | 9/1995 | Van Dusen |
| 5,573,165 A | * 11/1996 | Bloemer et al. ............. 224/523 |
| 5,615,904 A | * 4/1997 | Van Dusen et al. ......... 280/506 |
| 5,826,767 A | * 10/1998 | Chimenti et al. ........... 224/324 |
| D401,195 S | 11/1998 | Chimenti |
| 5,931,362 A | 8/1999 | Chimenti |
| 6,000,594 A | 12/1999 | Chimenti |
| 6,123,498 A | * 9/2000 | Surkin .................... 224/924 X |
| 6,164,508 A | * 12/2000 | van Veenen ................. 224/509 |

* cited by examiner

Primary Examiner—Stephen K. Cronin
(74) Attorney, Agent, or Firm—Kolisch Hartwell Dickinson & Heuser (57) ABSTRACT

A vehicle load carrier configured to carry recreational equipment on the exterior of a vehicle, including a recreational equipment rack configured for exterior engagement with a vehicle and a coupling mechanism configured to secure an article to the recreational equipment rack. The coupling mechanism includes a tube having two opposed walls, a removable fastener member configured to be positioned between the opposed walls and a torque-receiving member for receiving an externally applied torque. The coupling mechanism is adapted so that the article is selectively clamped to and released from one of the opposed walls of the tube upon rotation of the torque-receiving member relative to the removable fastener member. The other of the opposed walls is configured to hold the removable fastener member fixed against rotation relative to the tube.

35 Claims, 5 Drawing Sheets

VEHICLE LOAD CARRIER AND FASTENING MECHANISM

FIELD OF THE INVENTION

The present invention relates to vehicle load carriers for carrying cargo, and more particularly, to a vehicle load carrier with a fastening mechanism for securing a cargo support structure to a vehicle attachment structure of the load carrier.

BACKGROUND OF THE INVENTION

Load carriers for carrying cargo on the exterior of a vehicle take various forms and are widely known. Common load carrier components include a cargo support structure for carrying various types of cargo and a vehicle attachment for securing the cargo support structure to a vehicle. The cargo support structure may be configured for use with luggage, various types of recreational equipment, or virtually any other type of load. The vehicle attachment structure is secured to the cargo support structure and may include various structures configured to mount the load carrier to a vehicle. For example, many vehicle load carriers are mounted to an automobile via a hitch receiver provided on the rear bumper region of the automobile. Other load carriers are mounted to the roof, rear gate, doors or other structures provided on the exterior of an automobile.

Known load carriers suffer from various problems related to connecting the cargo support structure to the vehicle attachment structure. For example, the cargo support structure is often integrally formed with, or otherwise permanently secured to the vehicle attachment structure. This is undesirable from a manufacturing standpoint because the end product is bulkier, and thus more difficult to package and ship. In addition, extra steps are often required to manufacture vehicle load carriers having permanently affixed cargo support structures.

These designs may also be problematic for an end-user. For example, cargo support structures specifically designed to carry bicycles are not normally suitable for supporting luggage carriers, nor are they easily adapted to that task. If a cargo support structure having such a design were permanently affixed to a vehicle attachment structure, a completely different vehicle load carrier would be required for use with luggage carriers and loads other than bicycles. In general, vehicle load carriers with permanently affixed cargo support structures are not easily adapted for use with different to types of loads.

Some vehicle load carriers include cargo support structures that are not permanently secured to the vehicle attachment structure, allowing a user to assemble and disassemble the load carrier. However, these designs often employ fastening mechanisms for securing the load carrier structures together that require numerous parts, that are difficult to operate, or that don't tightly secure the structures together. Many of these designs allow play or other relative movements to occur between the load carrier components, leading to undesirable rattling or creaking noises and increased wear. Relative movements between the components may, in turn, be distracting or disconcerting to the occupants of the vehicle, and increase the risk that the supported cargo or load carrier itself will become unsecured from the vehicle.

DETAILED DESCRIPTION OF THE INVENTION

Figure 1:
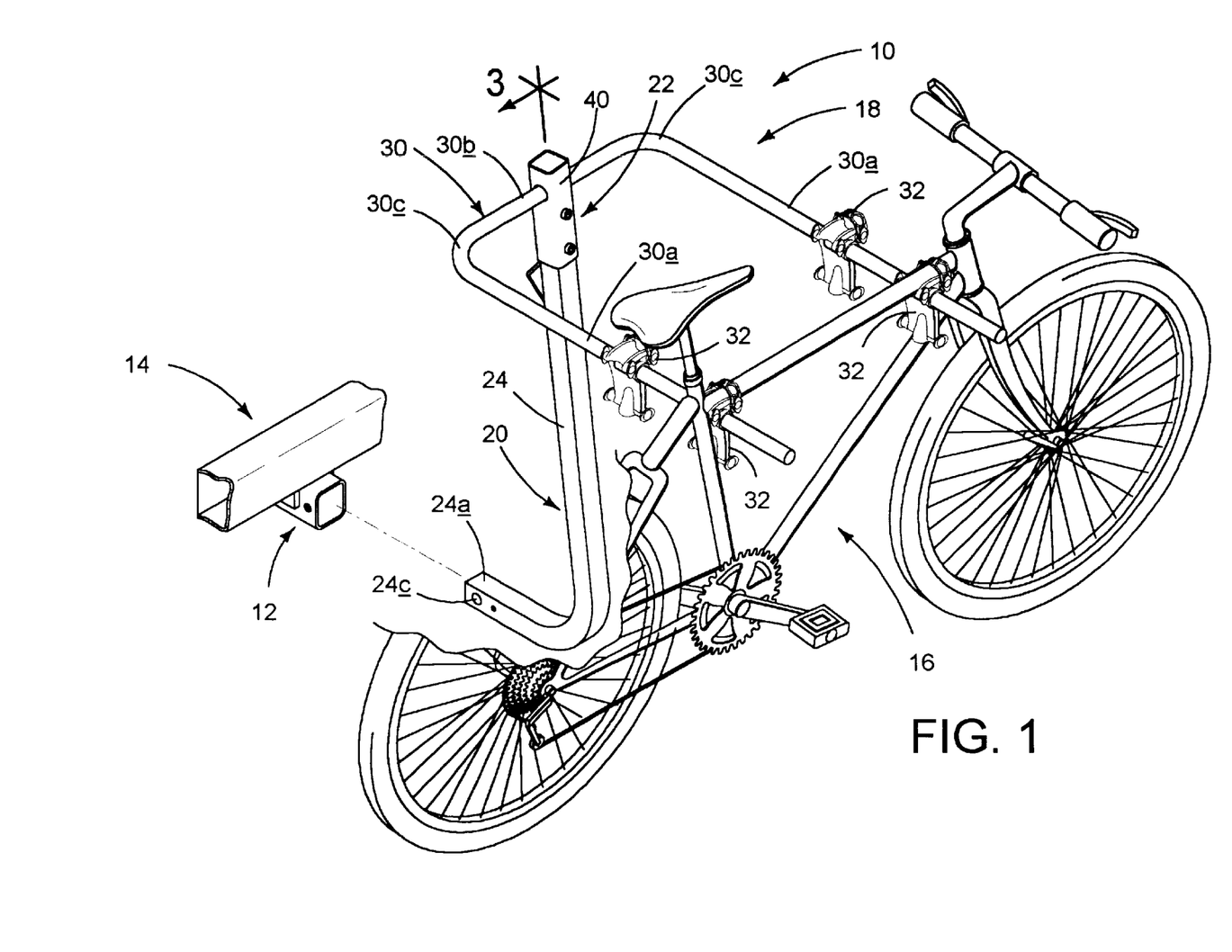
FIG. 1 is an isometric view of an embodiment of a vehicle load carrier constructed according to the present invention, including a hitch-mountable vehicle attachment structure and a cargo support structure adapted for use with a bicycle.
Figure 2:
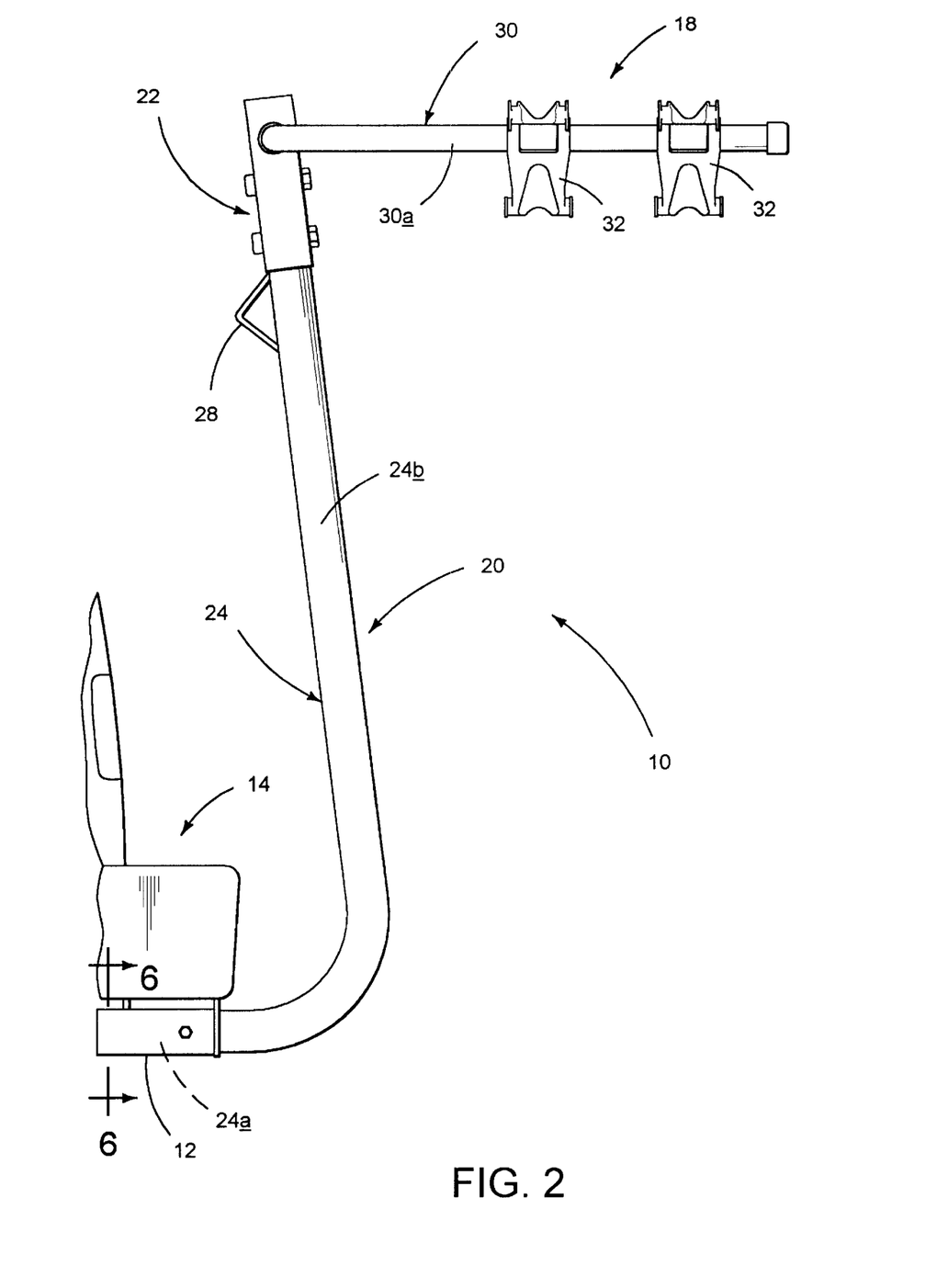
FIG. 2 is a side view of the vehicle load carrier of FIG. 1.

FIGS. 1 and 2 depict a vehicle load carrier 10 constructed according to the present invention. Vehicle load carrier 10 is configured to be secured to hitch receiver 12 provided on rear bumper region 14 of a vehicle, and is adapted to support and carry bicycle 16 on the exterior of a vehicle. Vehicle load carrier 10 includes a recreational equipment rack adapted for engagement on the exterior of a vehicle, including a cargo support structure 18, a vehicle attachment structure 20 and a fastening mechanism 22 configured to secure the cargo support structure to the vehicle attachment structure.

Vehicle attachment structure 20 may be alternately embodied in a variety of ways to connect the other components of load carrier 10 to a vehicle. For example, vehicle attachment structure 20 may include bars, rods, straps, masts, pads, and other components configured to contact a vehicle and secure other load carrier components to the vehicle. These components may contact virtually any exterior feature of a vehicle, for example the trunk, roof, side panel, window, door, rear gate/hatch, bumper, etc. of an automobile, in order to mount the load carrier on the vehicle.

In particular, as seen in FIGS. 1 and 2, vehicle attachment structure 20 may include a mast 24 configured to be secured within hitch receiver 12, which is of a type commonly found on the rear bumper region of a vehicle. Mast 24 may be formed of a variety of materials, and have any desired shape or size, depending on the vehicle and the load to be carried. Mast 24 is typically formed to be at least partially hollow, to make the vehicle load carrier lightweight, and to save on materials and manufacturing costs. As will be later explained, a hollow construction may also facilitate securing the mast to a vehicle hitch receiver and to various other components of load carrier 10.

Mast 24 includes at one end a hitch attachment member such as hitch insertion 24a. Hitch insertion 24a has a cross-section that corresponds to the opening of hitch receiver 12, and is configured to be received by and secured within the hitch receiver. Opposite hitch insertion 24a, mast 24 is secured to cargo support structure 18 via fastening mechanism 22, to be explained with reference to FIG. 3. Mast 24 is typically curved or bent between its opposed ends, so that an upper portion 24b of the mast is generally vertical when hitch insertion 24a is secured within hitch receiver 12. The mast may, however, extend straight out of hitch receiver 12 or have other desired configurations. Mast 24 may also include a locking member, such as anchor 28, for receiving a cable or similar device to lock cargo to load carrier 10, and/or lock the load carrier to a vehicle. As will be explained with reference to FIG. 6, various other structures may be provided to tightly secure the mast to a hitch receiver, and to enable a user to easily configure the invented load carrier for use with hitch receivers of varying sizes.

Referring still to FIGS. 1 and 2, cargo support structure 18 may be configured to support virtually any type of load, including luggage, recreational equipment and other loads. In the depicted embodiment, cargo support structure 18 is adapted to support a bicycle and includes a support member 30 secured to mast 24 via fastening mechanism 22. As shown, support member 30 may be formed as a curved or bent bar, including two arm portions 30a that are generally parallel to the ground and extend away from mast 24. Arm portions 30a may be provided with one or more pairs of cradle structures 32 configured to support a top tube and/or other portions of a bicycle. The depicted embodiment includes two pairs of cradle structures to accommodate two bicycles, however the arm portions may be provided with a single pair of cradle structures, or with three or more pairs. Cradle structures 32 are typically movably connected to arm portions 30a, and may be positioned in any desired location along the length of the arm portions. The cradles are preferably formed from rubber or a similar elastomeric material, to dampen vibration and protect the exterior surfaces of the supported bicycle.

Figure 3:
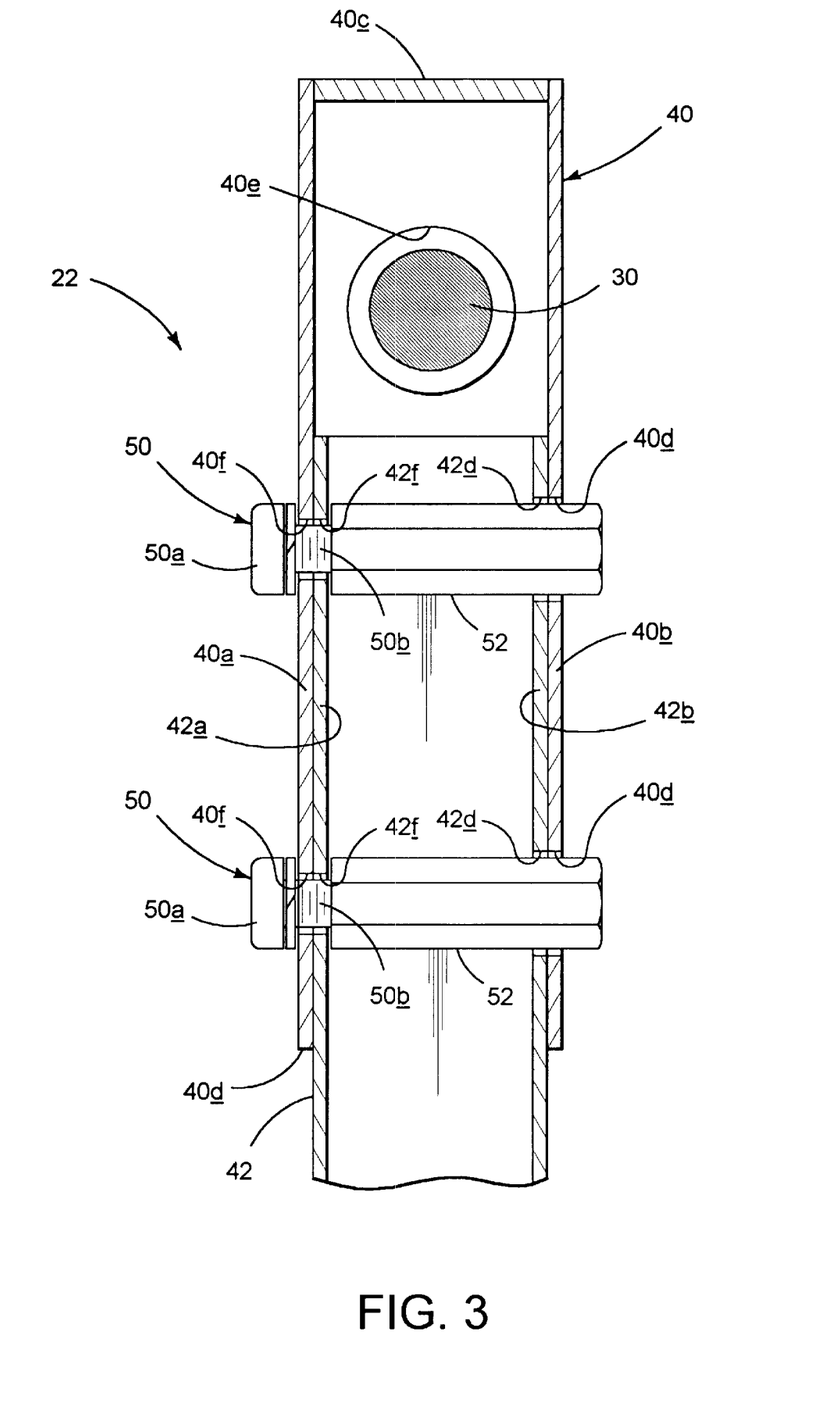
FIG. 3 is partial cross-sectional view taken along line 3—3 in FIG. 1, depicting an embodiment of a fastening mechanism constructed according to the present invention.

Referring now to FIG. 3, fastening mechanism 22 will be described, along with the portions of vehicle attachment structure 20 and cargo support structure 18 that interface with the fastening mechanism. Fastening mechanism 22 is configured to secure the cargo support structure to the vehicle attachment structure and includes a first structure, such as coupler tube 40, having an inaccessible area bounded by two opposed walls 40a and 40b. The fastening mechanism also includes a second structure, such as coupler tube 42, configured to be fastened adjacent one of the opposed walls of the first structure.

More particularly, coupler tube 40 may be formed as a hollow tube with a continuous sidewall, a closed top end 40c and an open bottom end 40d. The interior region between the opposed sidewalls is "inaccessible" in the sense that it is difficult for a user to access this interior region for the purpose of securing or clamping one of the opposed sidewalls to another structure. Coupler tube 42 may have a similar tubular configuration, including opposing sidewall regions 42a and 42b, and may be formed integrally with mast 24, or formed separately and secured to a portion of the mast spaced from hitch insertion 24a. Typically, coupler tube 40 has a larger cross section than coupler tube 42 to allow it to be fitted over the top end of the coupler tube 42 so that the tubes are in a telescoping configuration, as seen in FIG. 3. When tubes 40 and 42 are fitted together, the wall portions 40a and 42a and opposing wall portions 42a and 42b are adjacent. Alternatively, coupler tube 40 may be formed to have a smaller cross section than coupler tube 42 and fitted inside coupler tube 42.

Fastening mechanism 22 further includes a torque-receiving fastener portion or clamping member, such as bolt head 50a, for receiving an externally applied torque, and a stationary fastener portion, such as nut 52. The fastener portions are positioned on opposite sides of wall portions 40a and 42a and operatively connected so that relative rotation between the fastener portions causes them to be drawn together to secure or clamp the wall portions therebetween. At least one of the opposing wall portions 40b and 42b is adapted to hold nut 52 fixed against rotation relative to coupler tube 40 and/or coupler tube 42.

More particularly, bolt head 50a may form part of a bolt 50 that engages nut 52 to secure the wall portions 40a and 42a therebetween. The depicted fastening mechanism includes two bolts, though a single bolt may be used, or three or more as desired. Bolt head 50a may be allen-type, or have any other configuration capable of receiving an externally applied torque, such as that applied by hand, or applied using a wrench, allen key or other tool. Bolt 50 includes an externally threaded post 50b fixed to and extending from bolt head 50 through holes 4of and 42f formed in the sidewall regions of the coupler tubes. Nut 52 is positioned partly within the interior of coupler tube 42 and is provided with internal threads for engaging post 50b. The bolt head and nut are preferably oversized relative to holes 4of and 42f, which are typically formed to be just wide enough to accommodate post 50b.

One or both of opposing wall portions 40b and 42b may be adapted to hold nut 52 fixed against rotation relative to coupler tubes 40 and 42. Typically, nut 52 is elongate with a length equal to or greater than the width of the coupler tubes. This allows the nut to be extended from wall portions 40a and 42a through the interior of the coupler tubes, and out through holes 40d and 42d provided in opposing wall portions 40b and 42b of the coupler tubes. Nut 52 may be formed to have a grippable exterior contour, with one or both of holes 40d and 42d having edges adapted to grip the contour. For example, in the depicted embodiment, nut 52 is a hex-type nut having a hexagonal contour. Holes 40d and 42d are similarly hexagonal and sized to hold nut 52 fixed against rotation relative to the tubes. One or both of opposing wall portions 40b and 42b may be adapted in a variety of other ways to hold nut 52 or other stationary fastener portions fixed against rotation. For example, instead of holes for gripping the nut, the opposing sidewall of coupler tube 42 may include a depression or inward-projecting features shaped to secure the nut against rotation.

The disclosed fastening mechanism has a number of advantages. First, the mating portions of the coupler tubes may be secured together by simply engaging bolt 50 and nut 52 and then applying torque to bolt head 50a. No additional tool is required to hold the nut fixed against rotation, and no retainer need be positioned inside the coupler tubes to hold the nut. This makes the invented load carrier easier to use, and reduces costs by minimizing the number of parts necessary to secure the load carrier components together. In addition, the fastening mechanism clamps the coupler tubes against each other as opposed to simply engaging an outer surface of one of the tubes, in order to provide a more secure connection between the load carrier components. Further, nut 52 is typically elongate so that a portion of the nut extends beyond the opposing sidewall regions, and is thus exposed outside of the coupler tubes. This enables a user to grasp the exposed portion to easily position the nut for engagement with the bolt. In addition to these advantages, the invented fastening mechanism allows a user to easily swap between cargo support structures having different configurations and adapted to carry different types of loads.

It should be understood that the invented fastening/clamping mechanism may be embodied in many forms, and is not limited to use for coupling a cargo support structure to a vehicle attachment structure. For example, a fastener having certain of the features described with reference to FIG. 3 may be used to secure a recreational equipment rack to a vehicle hitch receiver. Such a fastener may also be used as a clamping mechanism configured to clamp or fasten a piece of recreational equipment to a load carrier.

As indicated above, cargo support structure 18 may include a support member in the form of a curved bar 30. Bar 30 is integrally formed and has an intermediate section 30b that is secured to coupler tube 40, with curved corner regions 30c being between the intermediate section and arms 30a. It is often desirable that bar 30 be integrally formed in a curved configuration before it is assembled to the other components, to simplify manufacture of the load carrier and allow for separate fabrication of its component parts.

Figure 4:
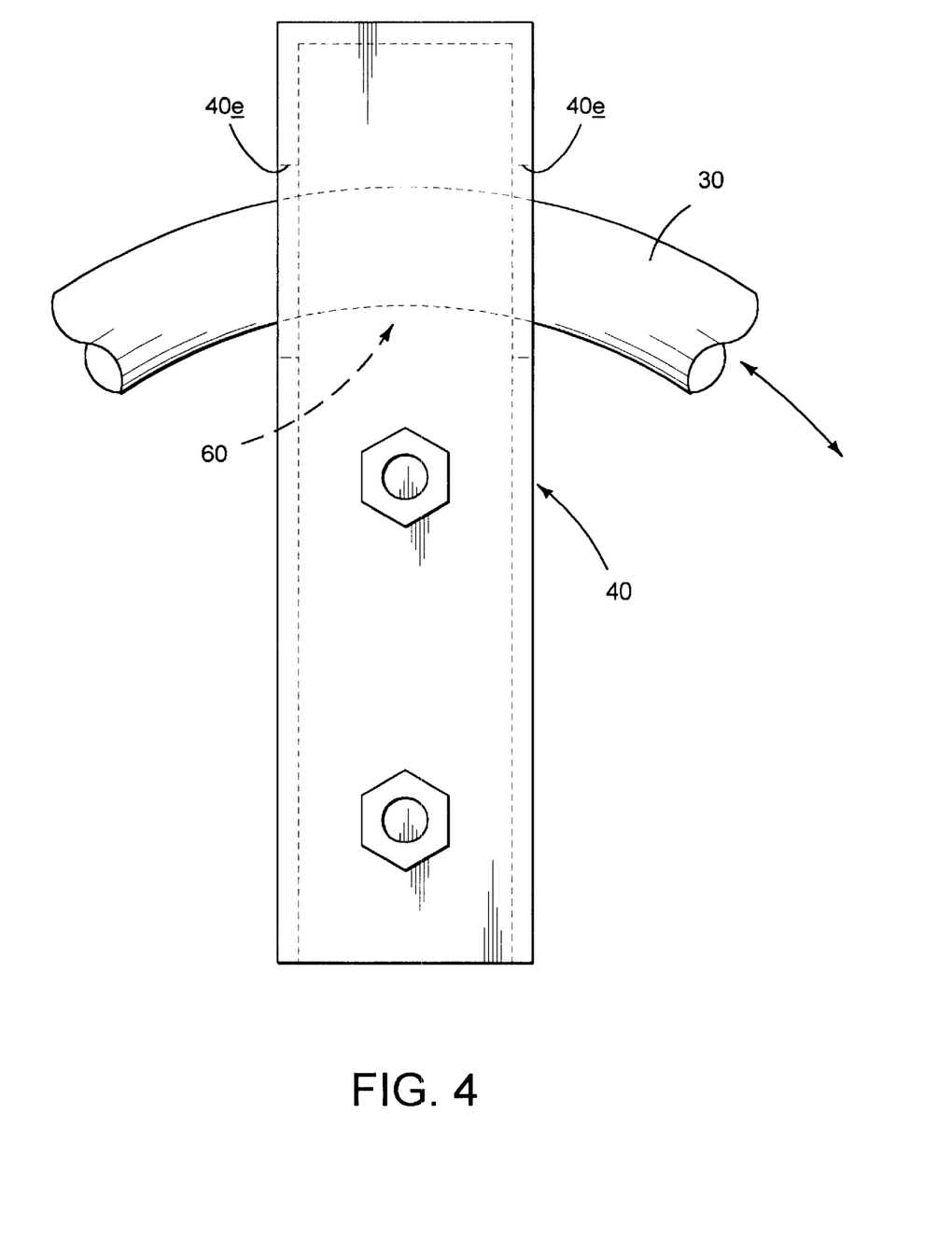
FIG. 4 is a rear view of the fastening mechanism of FIG. 3, depicting a method for securing a cargo support structure to a vehicle attachment structure.

If bar 30 is separately formed, further manufacturing steps may include passing the bar through a hole or passage 60 defined through coupler tube 40 to locate the bar in a desired position. As seen in FIGS. 3 and 4, passage 60 is defined by openings 40e formed in opposing sidewalls of coupler tube 40, and by the interior of the coupler tube. As best seen in FIG. 3, openings 40e are larger than the cross section of curved bar 30, to accommodate insertion of the curved regions through passage 60. The bar is passed in a lengthwise direction through the passage so that the curved portions of the bar pass through the passage, as seen in FIG. 4. The bar is inserted through the passage until located in a desired position, in which a portion of the bar is disposed within the passage. Once in the desired position, bar 30 may be fixed to coupler tube 40 by welding or other suitable methods.

Figure 5:
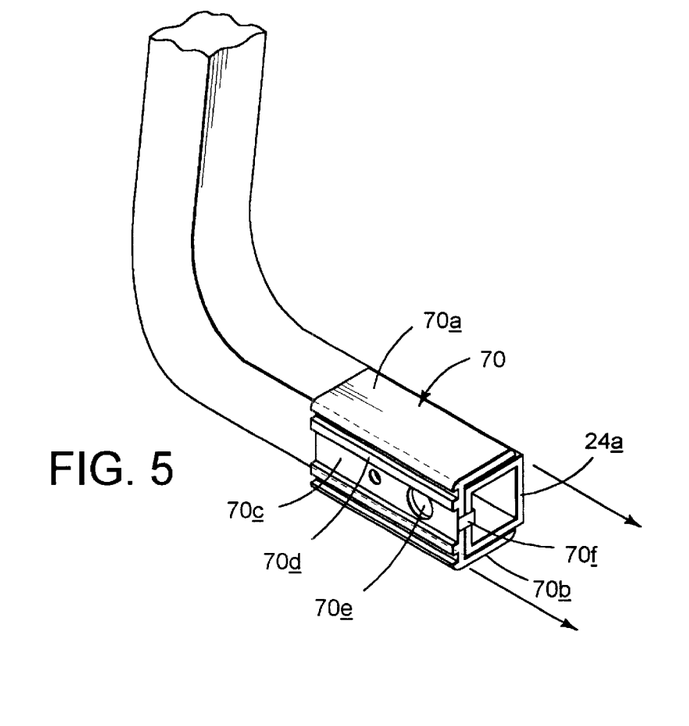
FIG. 5 is an isometric view of a portion of the hitch-mountable vehicle attachment structure of FIGS. 1 and 2.

FIG. 5 depicts a shim 70 that may be fitted to hitch insertion 24a to easily adapt the invented vehicle load carrier for use with hitch receivers of varying sizes. Hitch receivers are typically tubular sockets having square openings for receiving a hitch insertion. Further, hitch receivers normally come in standard sizes, for example 2"×2" or 1¾41 ×1¾". Hitch insertion 24a is sized for use with one particular size receiver, but may be fitted with shim 70 to configure the invented load carrier for use with a larger size hitch receiver.

As seen in FIG. 5, shim 70 may have an elongate body including a top spacer portion 70a a bottom spacer portion 70b and a side spacer portion 70c, with the side spacer portion including ribs 70d and a hole 70e defined therethrough. The shim is configured to be fitted to the outer surface of hitch attachment member 24a to provide a spacer and thus enable the hitch attachment member to be snugly fitted into a larger size hitch receiver. Hole 70e is configured to be aligned with transverse hole 24c provided through hitch insertion 24a, to accommodate transverse insertion of a post or other locking structure for securing the hitch insertion within the hitch receiver. In addition, shim 70 may include a tab 70f provided near an end of the shim that projects inward from the shim body toward the hitch receiver. Tab 70f contacts the end of hitch insertion 24a, and thus provides a stop that maintains the shim in a desired predetermined position relative to the hitch insertion in which hole 70e aligns with hole 24c.

Figure 6:
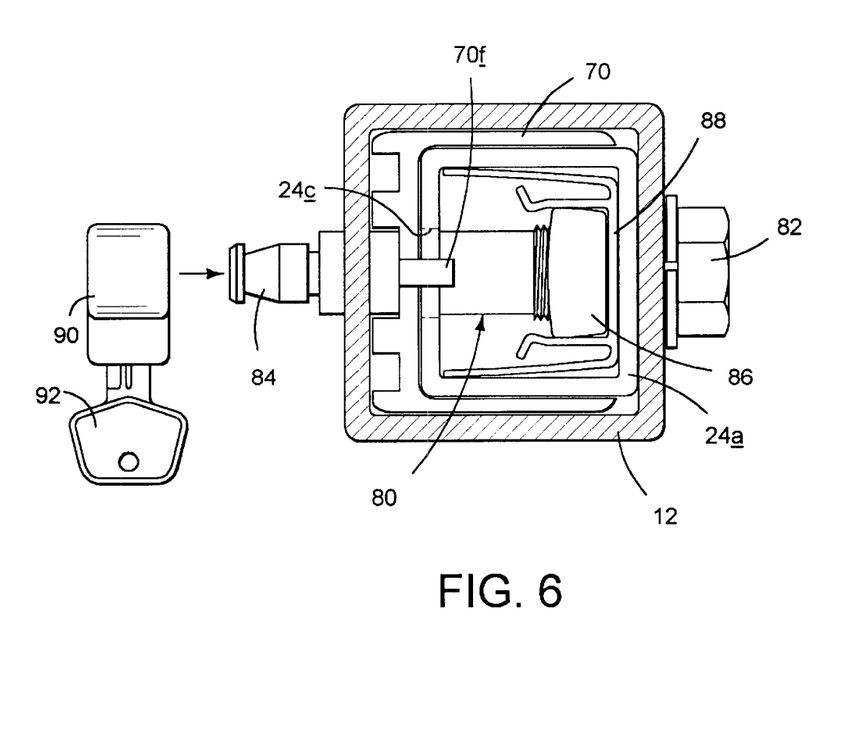
FIG. 6 is cross-sectional end view taken along line 6—6 of FIG. 1, depicting the vehicle attachment structure of FIG. 5 secured within a hitch receiver of the type commonly found on a rear bumper region of an automobile.

FIG. 6 depicts hitch insertion 24a fitted with shim 70 and secured within hitch receiver 12 with various other components. Locking post 80 extends transversely through aligned holes provided in the hitch insertion, shim and hitch receiver, and prevents the hitch insertion from being pulled out of the hitch receiver. Locking post 80 includes a bolt head 82 at one end and a locking nub 84 at an opposite end. Between its opposed ends, locking post 80 includes a threaded portion configured to engage nut 86 to selectively secure the hitch insertion within the hitch receiver. Nut retainer 88 is positioned within the interior of hitch insertion 24a to hold the nut in place and prevent it from rotating with locking post 80 as bolt head 82 is rotated to tighten or loosen the locking post and nut. In addition to the functions described above, shim tab 70f prevents nut retainer 88 from being inserted improperly into hitch insertion 24a. Lastly, a pin lock 90 may be provided to engage locking nub 84 and prevent removal of locking post 80. Pin lock 90 includes an opening for receiving locking nub 84 and a locking mechanism actuated by key 92 to selectively lock the pin lock to the locking nub. When secured to the locking nub, pin lock 90 prevents withdrawal of the locking post, even if locking post 80 and nut 86 are loosened.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, fictions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A vehicle load carrier configured to carry recreational equipment on the exterior of a vehicle, comprising:
   a recreational equipment rack configured for exterior engagement with a vehicle; and
   a coupling mechanism configured to secure an article to the recreational equipment rack, including:
      a tube having two opposed walls;
      a removable fastener member configured to be positioned between the opposed walls; and
      a torque-receiving member for receiving an externally applied torque, where the coupling mechanism is adapted to selectively clamp and release the article to one of the opposed walls of the tube upon rotation of the torque-receiving member relative to the removable fastener member, the other of the opposed walls being configured to hold the removable fastener member fixed against rotation relative to the tube.

2. The vehicle load carrier of claim 1, where the removable fastener member is elongate and long enough to extend between the opposed walls of the tube.

3. The vehicle load carrier of claim 1, where the article is another component of the recreational equipment rack.

4. The vehicle load carrier of claim 1, where the removable fastener member includes a grippable contour, and where said other of the opposed walls of the tube is configured to grip the contour.

5. The vehicle load carrier of claim 4, wherein the removable fastener member includes a hex nut, and where a hole is defined through said other of the opposed walls of the tube, the hole having an edge configured to grip the hex nut.

6. The vehicle load carrier of claim 4, where the grippable contour is defined by an exterior surface of the removable fastener member.

7. The vehicle load carrier of claim 6, where a hole is defined through said other of the opposed walls of the tube, the hole having an edge configured to grip the exterior surface of the removable fastener member.

8. A vehicle load carrier, comprising:
   a cargo support structure;
   a vehicle attachment structure; and
   a fastening mechanism configured to secure the cargo support structure to the vehicle attachment structure, including:
      a first structure having an inaccessible area bounded by two opposed walls;
      a second structure configured to be fastened adjacent one of the opposed walls of the first structure;
      a torque-receiving fastener member for receiving an externally applied torque; and
      a stationary fastener member configured to be at least partly disposed in the inaccessible area, where the fastener members are configured to be operatively connected so that relative rotation between the fastener members causes them to be drawn together to clamp the second structure and said one of the opposed walls of the first structure therebetween, the other of the opposed walls being configured to hold the stationary fastener member fixed against rotation relative to the first structure.

9. The vehicle load carrier of claim 8, where the stationary fastener member is elongate and long enough to extend between the opposed walls of the first structure.

10. The vehicle load carrier of claim 8, where the first structure is a tube secured to the cargo support structure, and where the second structure is secured to the vehicle attachment structure.

11. The vehicle load carrier of claim 8, where the vehicle attachment structure includes a hitch attachment member configured to be inserted into a hitch receiver so that transverse holes provided in the hitch attachment member and hitch receiver are aligned, further comprising:
   a post including a head and a threaded portion, the post being configured to be inserted through the transverse holes of the hitch attachment member and hitch receiver when they are aligned so that the threaded portion extends from the head through the transverse holes to be received by a threaded member, where the hitch attachment member is selectively secured and released to the hitch receiver upon rotation of the post relative to the threaded member.

12. The vehicle load carrier of claim 8, where the cargo support structure is adapted to carry a bicycle.

13. The vehicle load carrier of claim 12, where the cargo support structure includes an elongate bar and a plurality of cradle structures for supporting a bicycle.

14. The vehicle load carrier of claim 8, where the vehicle attachment structure includes a hitch attachment member configured to be inserted into a hitch receiver, further comprising a shim including a body configured to be fitted to an outer surface of the hitch attachment member to adapt the hitch attachment member for use with a larger size hitch receiver.

15. The vehicle load carrier of claim 14, where the larger size hitch receiver and hitch attachment member include transverse holes that are aligned when the hitch attachment member and shim are inserted into the larger size hitch receiver, the shim further including a tab projecting inward and configured to contact an end of the hitch attachment member to maintain the shim in a predetermined orientation relative to the hitch attachment member, in which a hole provided through the body of the shim is aligned with the transverse hole provided in the hitch attachment member.

16. The vehicle load carrier of claim 14, where the shim further includes:
   a shim hole defined through the shim body and being configured to align with transverse holes provided through the hitch attachment member and larger size hitch receiver, the transverse holes being aligned when the hitch attachment member and shim are inserted into the larger size hitch receiver; and
   ribs projecting outward from the shim body on opposing sides of the shim hole.

17. The vehicle load carrier of claim 8, where the stationary fastener member includes a grippable contour, and where said other of the opposed walls of the first structure is configured to grip the contour.

18. The vehicle load carrier of claim 17, wherein the stationary fastener member includes a hex nut, and where a hole is defined through said other of the opposed walls of the first structure, the hole having an edge configured to grip the hex nut.

19. The vehicle load carrier of claim 17, where the grippable contour is defined by an exterior surface of the stationary fastener member.

20. The vehicle load carrier of claim 19, where a hole is defined through said other of the opposed walls of the first structure, the hole having an edge configured to grip the exterior surface of the stationary fastener member.

21. A vehicle load carrier, comprising:
   a cargo support structure;
   a vehicle attachment structure; and
   a clamping mechanism configured to secure the cargo support structure to the vehicle attachment structure, including:
      two telescoping pieces of tubing defining an interior region;
      a torque-receiving clamp member; and
      a stationary clamp member configured to be inserted at least partially into the interior region through transverse aligned holes provided in the telescoping pieces of tubing, where adjacent walls of the two pieces of tubing are selectively clamped together between the clamp members in an area opposite the aligned holes upon rotation of the torque-receiving clamp member, and where one of the aligned holes is configured to hold the stationary clamp member fixed against rotation relative to the pieces of tubing.

22. The vehicle load carrier of claim 21, where the stationary clamp member includes a hex nut, and where said one of the aligned holes is hexagonally shaped and configured to grip the hex nut.

23. The vehicle load carrier of claim 21, where the cargo support structure is adapted to carry a bicycle.

24. A vehicle load carrier, comprising:
   a vehicle attachment structure including a hitch attachment member configured to be inserted into a hitch receiver so that transverse holes provided in the hitch attachment member and hitch receiver are aligned; and
   a post including a head and a threaded portion, the post being configured to be inserted through the transverse holes of the hitch attachment member and hitch receiver when they are aligned so that the threaded portion extends from the head through the transverse holes to be received by a threaded member, where the hitch attachment member is selectively secured and released to the hitch receiver upon rotation of the post relative to the threaded member.

25. The vehicle load carrier of claim 24, where the threaded member is a nut configured to be positioned within a hollow interior region of the hitch attachment member and engaged with the threaded portion of the post.

26. The vehicle load carrier of claim 25, further comprising a nut retainer configured to be positioned within the hollow interior region of the hitch attachment member to hold the nut fixed against rotation relative to the hitch attachment member.

27. The vehicle load carrier of claim 26, where the nut retainer includes outwardly-biased arms that contact an interior wall bounding the hollow interior region of the hitch attachment member.

28. The vehicle load carrier of claim 24, further comprising a shim configured to be fitted to the hitch attachment member to adapt the hitch attachment member for use with a larger size hitch receiver.

29. The vehicle load carrier of claim 28, where the shim includes:

a body configured to be fitted adjacent an outside surface of the hitch attachment member, a hole being defined through the body; and a tab projecting inward from the body toward the hitch attachment member, the tab being configured to contact an end of the hitch attachment member to maintain the shim in a desired position relative to the hitch attachment member, in which the hole in the shim body is aligned with the transverse hole provided in the hitch attachment member.

30. A vehicle load carrier, comprising:

a vehicle attachment structure including a hitch attachment member configured to be inserted into a hitch receiver; and a shim including a body configured to be fitted to an outer surface of the hitch attachment member to adapt the hitch attachment member for use with a larger size hitch receiver, the larger size hitch receiver and hitch attachment member including transverse holes that are aligned when the hitch attachment member and shim are inserted into the larger size hitch receiver, the shim further including a tab projecting inward and configured to contact an end of the hitch attachment member to maintain the shim in a predetermined orientation relative to the hitch attachment member, in which a hole provided through the body of the shim is aligned with the transverse hole provided in the hitch attachment member.

31. A vehicle load carrier, comprising:

a vehicle attachment structure including a hitch attachment member configured to be inserted into a hitch receiver; and a shim configured to adapt the hitch attachment member for use with a larger size hitch receiver, including:

a body configured to be fitted to an outer surface of the hitch attachment member;

a shim hole defined through the shim body and being configured to align with transverse holes provided through the hitch attachment member and larger size hitch receiver, the transverse holes being aligned when the hitch attachment member and shim are inserted into the larger size hitch receiver; and ribs projecting outward from the shim body on opposing sides of the shim hole.

32. A method of manufacturing a vehicle load carrier, comprising:

providing an integrally formed elongate bar having a curved region and a cross-section;

providing a bar receiving member;

forming a passage through the bar receiving member, the passage being adapted to accommodate lengthwise passage of the curved region of the bar therethrough;

inserting the bar into the passage in a lengthwise direction so that the curved region passes at least partially through the passage; and fixing the bar in a desired location so that the support bar is at least partially disposed within the passage.

33. The method of claim 32, where the bar receiving member includes an opening that is oversized relative to the cross section of the bar.

34. The method of claim 32, where fixing the bar in a desired location is performed by welding the bar to the bar receiving member.

35. A method of coupling an article to a vehicle load carrier, comprising:

providing a vehicle load carrier configured to carry recreational equipment on the exterior of a vehicle, including a recreational equipment rack configured for exterior engagement with a vehicle;

providing a coupling mechanism, including;

a tube having two opposed walls;

a removable fastener member configured to be positioned between the opposed walls;

a torque-receiving member for receiving an externally applied torque, where the coupling mechanism is adapted to selectively clamp the article to and release the article from one of the opposed walls upon rotation of the torque-receiving member relative to the removable fastener member, the other of the opposed walls being configured to hold the removable fastener member fixed against rotation relative to the tube;

positioning the removable fastener portion between the opposed walls so that it is held by said other of the opposed walls;

positioning the article adjacent said one of the opposed walls; and rotating the torque-receiving member so that the article is clamped to said one of the opposed walls.

* * * * *